United States Patent
Kaps et al.

(10) Patent No.: US 11,439,141 B1
(45) Date of Patent: *Sep. 13, 2022

(54) BIRD DETERRENT AND REPELLANT DEVICE

(71) Applicants: Thomas Kaps, Jackson, NJ (US); Paul Rosario, Bayville, NJ (US)

(72) Inventors: Thomas Kaps, Jackson, NJ (US); Paul Rosario, Bayville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/339,141

(22) Filed: Jun. 4, 2021

Related U.S. Application Data (63) Continuation of application No. 16/941,943, filed on Jul. 29, 2020, now Pat. No. 11,051,507, which is a continuation of application No. 16/501,488, filed on Aug. 27, 2017, now abandoned.

(51) Int. Cl.
*A01M 29/32* (2011.01)

(52) U.S. Cl.
CPC .................. *A01M 29/32* (2013.01)

(58) Field of Classification Search
CPC ............................ A01M 29/30; A01M 29/32
USPC .......................................................... 52/101
See application file for complete search history.

(56) References Cited

U.S. PATENT DOCUMENTS

| | | | |
|---|---|---|---|
| 2,456,731 A | 12/1948 | Peles | |
| 2,458,727 A | 1/1949 | Peles | |
| 2,475,047 A | 7/1949 | Peles | |
| 3,282,000 A * | 11/1966 | Shaw | A01M 29/32 52/60 |
| 5,253,444 A | 10/1993 | Donoho et al. | |
| 5,433,029 A * | 7/1995 | Donoho | A01M 29/32 256/11 |
| 6,250,023 B1 | 6/2001 | Donoho | |
| 6,546,676 B2 | 4/2003 | Wiesener et al. | |
| 6,775,950 B2 | 8/2004 | Donoho | |
| 7,243,465 B2 | 7/2007 | Donoho | |
| 7,802,405 B1 | 9/2010 | Donoho et al. | |

(Continued)

FOREIGN PATENT DOCUMENTS

| | | |
|---|---|---|
| DE | 10055238 | 5/2002 |
| EP | 0895716 | 2/1999 |

(Continued)

*Primary Examiner* — Brent W Herring
(74) *Attorney, Agent, or Firm* — Goldstein Law Offices, P.C.

(57) ABSTRACT

A bird deterrent and repellant device includes a pair of holding members adapted to attach to a surface, base members connecting the main holding members, and spike members protruding upwardly from the base members and extending laterally outwardly with respect to the main holding members for preventing birds from landing on areas adjacent to the device. The base members are pivotally connected to the pair of elongated main holding members at pivot points, which allows the base members to rotate about the pivots points to transition the device between a wide configuration and a narrow configuration. In the wide configuration, the extent at which the spike members extend laterally outwardly relative to the main holding members is maximized for covering larger areas. In the narrow configuration, the extent at which the spike members extend laterally outwardly relative to the holding members is decreased to create a more compact device.

19 Claims, 6 Drawing Sheets

(56) References Cited

U.S. PATENT DOCUMENTS

| | | |
|---|---|---|
| D642,654 S | 8/2011 | Paulin |
| 8,065,842 B2 | 11/2011 | Donoho et al. |
| D654,139 S | 2/2012 | Paulin |
| 8,276,324 B2 | 10/2012 | Donoho |
| D672,425 S | 12/2012 | Meyers et al. |
| 8,479,456 B1 | 7/2013 | Donoho |
| 8,479,457 B2 | 7/2013 | Donoho |
| D693,899 S | 11/2013 | Donoho et al. |
| 8,601,747 B2 | 12/2013 | Donoho |
| D703,785 S | 4/2014 | McKenna |
| 8,689,498 B2 | 4/2014 | Donoho |
| 8,869,467 B2 | 10/2014 | Donoho |
| 9,003,718 B2 | 4/2015 | Donoho |
| 9,260,856 B2 | 2/2016 | Donoho |
| 9,504,245 B2 | 11/2016 | Donoho |
| D828,485 S | 9/2018 | Finkelstein |
| 10,278,381 B2 | 5/2019 | Bowman |
| 11,166,450 B2 * | 11/2021 | Donoho ............... A01M 29/32 |
| 2001/0017012 A1 | 8/2001 | Wiesener et al. |
| 2003/0172575 A1 | 9/2003 | Donoho |
| 2004/0040225 A1 | 3/2004 | Finkelstein |
| 2004/0216393 A1 | 11/2004 | Hall et al. |
| 2005/0160685 A1 | 7/2005 | Donoho |
| 2006/0096182 A1 | 5/2006 | Donoho |
| 2007/0180781 A1 | 8/2007 | Donoho |
| 2008/0277994 A1 | 11/2008 | Gray |
| 2009/0249710 A1 | 10/2009 | Donoho |
| 2010/0013123 A1 | 1/2010 | Donoho |
| 2011/0041420 A1 | 2/2011 | Donoho et al. |
| 2011/0214618 A1 | 9/2011 | Donoho |
| 2012/0030989 A1 | 2/2012 | Donoho |
| 2012/0031016 A1 | 2/2012 | Donoho |
| 2012/0227334 A1 | 9/2012 | Donoho |
| 2013/0000221 A1 | 1/2013 | Donoho |
| 2013/0199109 A1 | 8/2013 | Donoho |
| 2013/0247481 A1 | 9/2013 | Donoho |
| 2013/0291451 A1 | 11/2013 | Donoho |
| 2014/0007524 A1 | 1/2014 | Donoho |
| 2014/0041318 A1 | 2/2014 | Donoho |
| 2014/0144391 A1 | 5/2014 | Ashworth |
| 2014/0202090 A1 | 7/2014 | Donoho |
| 2015/0040838 A1 | 2/2015 | Hissom |
| 2015/0150238 A1 | 6/2015 | Donoho |
| 2015/0335007 A1 | 11/2015 | Donoho |
| 2016/0135445 A1 | 5/2016 | Donoho |
| 2016/0316740 A1 | 11/2016 | Donoho |
| 2017/0071189 A1 | 3/2017 | Donoho |
| 2017/0105404 A1 | 4/2017 | Donoho |
| 2017/0164603 A1 | 6/2017 | Kovarik et al. |
| 2018/0368390 A1 | 12/2018 | Bowman |

FOREIGN PATENT DOCUMENTS

| | | |
|---|---|---|
| EP | 1029453 | 8/2000 |
| FR | 2693080 | 1/1994 |
| FR | 2767027 | 2/1999 |
| WO | WO9531099 | 11/1995 |

* cited by examiner

BIRD DETERRENT AND REPELLANT DEVICE

CROSS-REFERENCING

This application is a continuation of U.S. patent application Ser. No. 16/941,943, filed on Jul. 29, 2020, which is a continuation of U.S. patent application Ser. No. 16/501,488, filed on Aug. 27, 2017. The foregoing applications are each incorporated by reference in their entirety herein.

TECHNICAL FIELD

The present disclosure relates generally to bird deterrents and repellant devices. More particularly, the present disclosure relates to a bird deterrent and repellant device that is rotatable to different configurations for mounting on a variety of surfaces.

BACKGROUND

The presence of birds on ledges, windowsills, roof tops, signs and other surfaces is often undesirable. Indeed, birds tend to be noisy and make an unsightly mess that can attract insects and provide a fertile bed for bacteria which can present a significant health hazard. Additionally, the unaesthetic appearance of bird droppings and the like often requires unpleasant and time consuming clean up where access to the droppings is available. Often, the repulsive appearance of bird droppings and other by-products of birds are not even accessible for clean-up.

It is known in the art to mount pointed objects, such as spikes and the like, on surfaces where it is desired to repel birds and other pests. Indeed, various bird and repellant devices include rigid structure having bases with spikes protruding upwardly therefrom that are oriented in various orientations. However, these devices have a drawback in that they include rigid bases that are neither flexible nor pivotable, which prevents them from being configurable into wider or narrower configurations to accommodate differently sized surfaces or areas and become more compact for transportation and storage purposes.

Accordingly, there is a need in the art for a bird deterrent and repellant device that may be rotated to different positions to accommodate surfaces having varying widths or sizes and to become more compact for transportation and storage purposes.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions, or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a bird deterrent and repellant device capable of pivoting between wide and narrow configurations. Accordingly, the present disclosure provides a bird deterrent and repellant device having a pair of elongated main holding members including a first elongated main holding member and a second elongated main holding member and a plurality of base members connecting the first elongated main holding member and the second elongated main holding member. Each of the base members are parallel with respect to one another and include a first end pivotally connected to the first elongated main holding member at a first pivot point and a second end pivotally connected to the second elongated main holding member at a second pivot point. The first end and the second end of the base members are configured to rotate clockwise or counterclockwise about the first pivot point and the second pivot point, respectively, relative to the first and second elongated main holding members to selectively transition the device between a wide configuration and a narrow configuration. In the wide configuration, the base members are substantially perpendicular to the first and second elongated main holding members, thereby maximizing a distance between the first and second elongated main holding members. In the narrow configuration, the base members are not perpendicular with respect to the first and second elongated main holding members and rather slanted with respect thereto, thereby decreasing the distance between the first and second elongated main holding members to a distance smaller than the distance between the first and second elongated main holding members in the wide configuration.

Another aspect of an example embodiment in the present disclosure is to provide a bird deterrent and repellant device including spike member that are able to deter various sizes of birds including bigger birds. Accordingly, the base members include a top surface having a plurality of spike members protruding upwardly from the top surface. The spike members include at least three spike members comprising an inner spike member and a first pair of outer spike members. The inner spike member includes a longitudinal length greater than a longitudinal length of the outer spike members in order to deter/repel larger birds. The outer spike members extend from the top surface between the first and the second pivot points, overhanging beyond the first pivot point and the second pivot point so as to protrude laterally to create larger coverage of bird deterrence/repellence.

Still another aspect of an example embodiment in the present disclosure is to provide a bird deterrent and repellant device capable of maximizing and decreasing the extent at which the spike members protrude laterally or overhang with respect to the pair of elongated main holding members. Accordingly, in the wide configuration, the extent at which the first pair of outer spike members extend laterally outwardly with respect to the first and second elongated main holding members is maximized as the base members are oriented more perpendicularly with respect to the pair of elongated main holding members. In the narrow configuration, the extent at which the first pair of outer spike members extend laterally outwardly with respect to the first and second elongated main holding members is decreased as the base members are pivoted with respect to the pair of elongated main holding members, such that the extent at which the first pair of outer spike members extend laterally outwardly with respect to the first and second elongated main holding members in the narrow configuration is smaller than the extent at which the first pair of outer spike members extend laterally outwardly with respect to the first and second elongated main holding members in the wide configuration.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
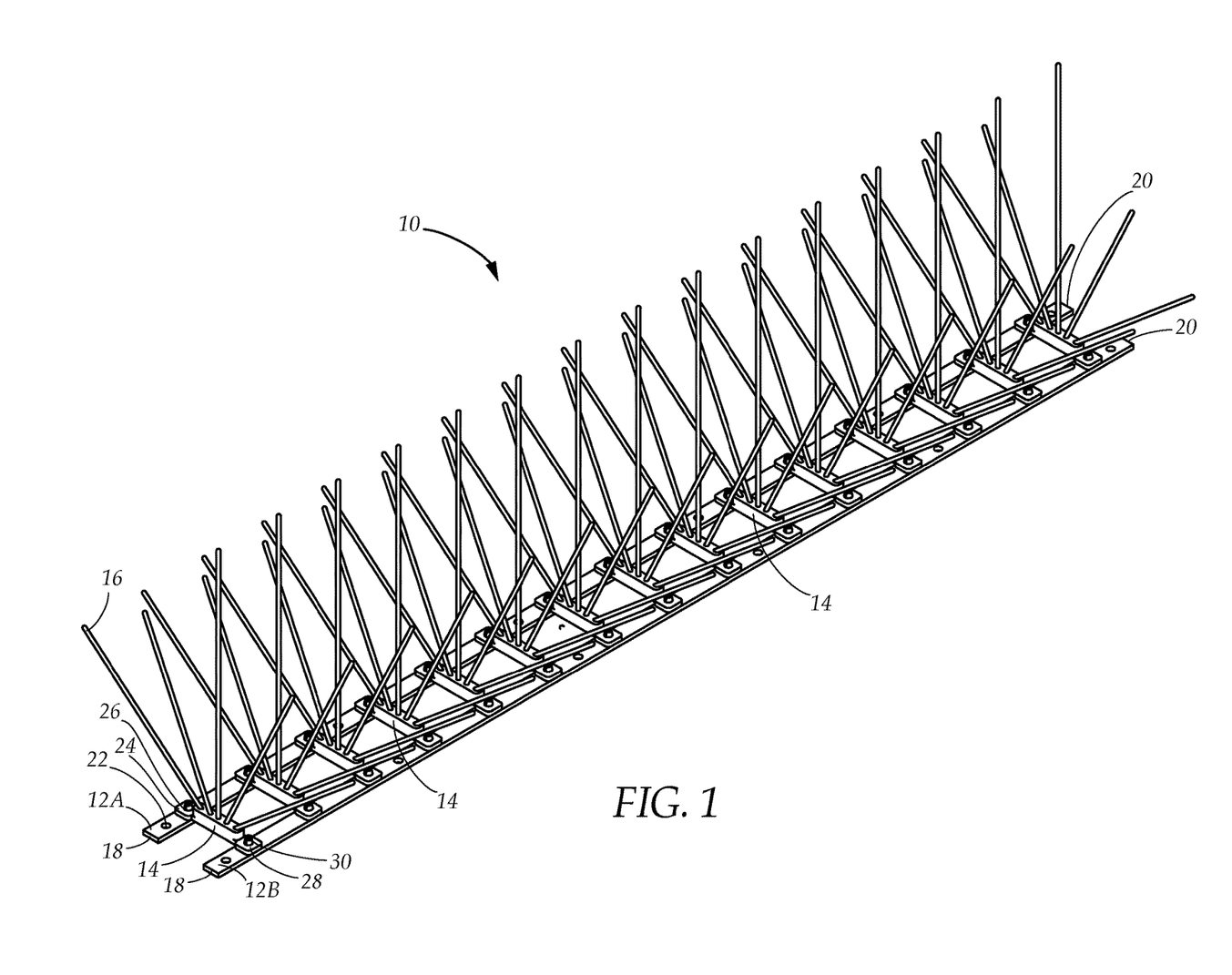
FIG. 1 is a perspective view of the bird deterrent and repellant device, illustrating the device in its wide configuration according to one embodiment of the present disclosure.
Figure 2:
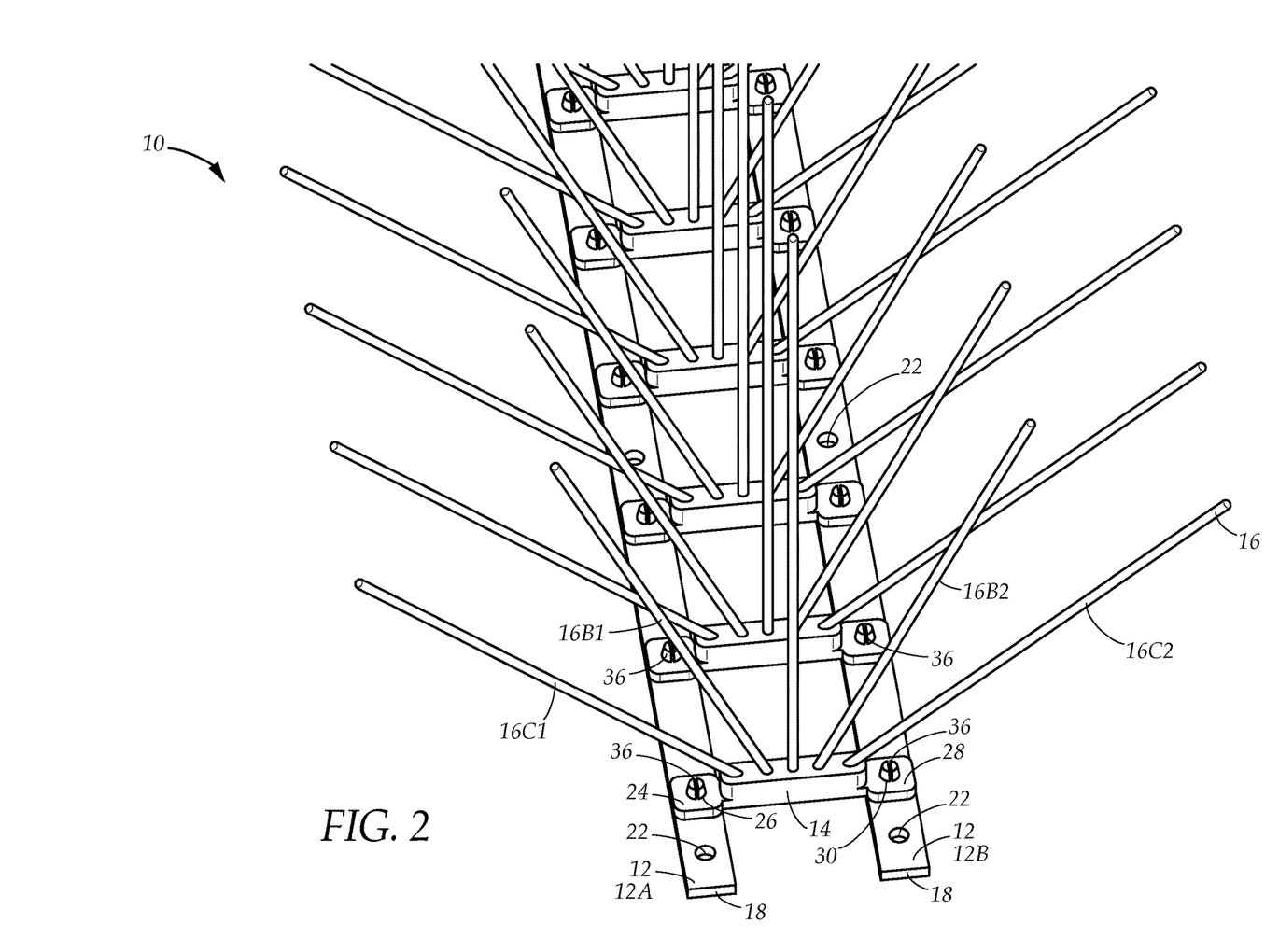
FIG. 2 is a close-up view of an end of the bird deterrent and repellant device, illustrating a closer view of the base members of the device according to one embodiment of the present disclosure.

FIGS. 1 and 2 illustrate a perspective view of the bird deterrent and repellant device 10. The bird deterrent and repellant device 10 comprises a pair of elongated main holding members 12 adapted to attach to a surface, such as a ledge, windowsill, roof top, sign, or the like, a plurality of base members 14 connecting the pair of elongated main holding members 12 that are pivotable relative to the pair of elongated main holding members 12 to allow the bird deterrent and repellant device 10 to transition between a wide configuration and a narrow configuration, and a plurality of spike members 16 protruding upwardly from the base members 14 and extending outwardly with respect to the pair of elongated main holding members 12 for preventing birds and other pests from landing or lofting on areas adjacent to the bird deterrent and repellant device 10.

The pair of elongated main holding members 12 include a first elongated main holding member 12A and a second elongated main holding member 12B comprise flexible bodies capable of bending and/or contouring around arcuate surfaces. The first elongated main holding member 12A and the second elongated main holding member 12B each include a first end 18, a second end 20 opposite the first end 18, a longitudinal length extending between the first end 18 and the second end 20, and one or more mounting holes 22 disposed along the longitudinal length of each of the first elongated main holding member 12A and the second elongated main holding member 12B. The mounting holes 22 are configured to receive a fastener, such as a screw, nail, bolt or the like, therethrough to fasten the first elongated main holding member 12A and the second elongated main holding member 12B to a surface.

The plurality of base members 14 connect the first elongated main holding member 12A and the second elongated main holding member 12B to each other. Each of the base members 14 is parallel with respect to one another and includes a first end 24 pivotally connected to the first elongated main holding member 12A at a first pivot point 26 and a second end 28 pivotally connected to the second elongated main holding member 12B at a second pivot point 30. The first ends 24 of each of the base members 14 are opposite the second ends 28 of each of the base members 14. Each of the base members 14 forms a quadrilateral with an adjacent base member 14.

Figure 4:
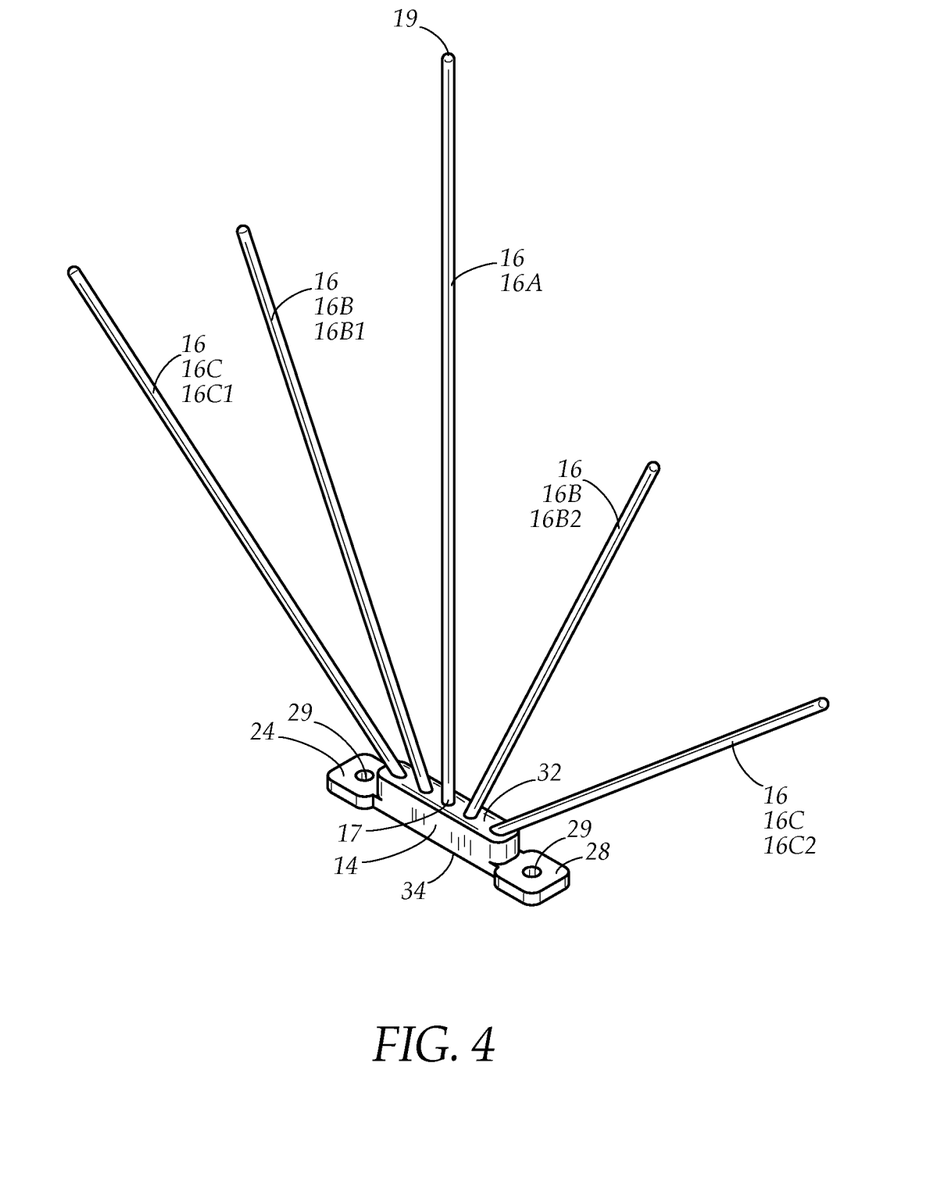
FIG. 4 is a perspective view of the base member of the bird deterrent and repellant device, illustrating the arrangement of the spike members thereon according to one embodiment of the present disclosure.
Figure 5:
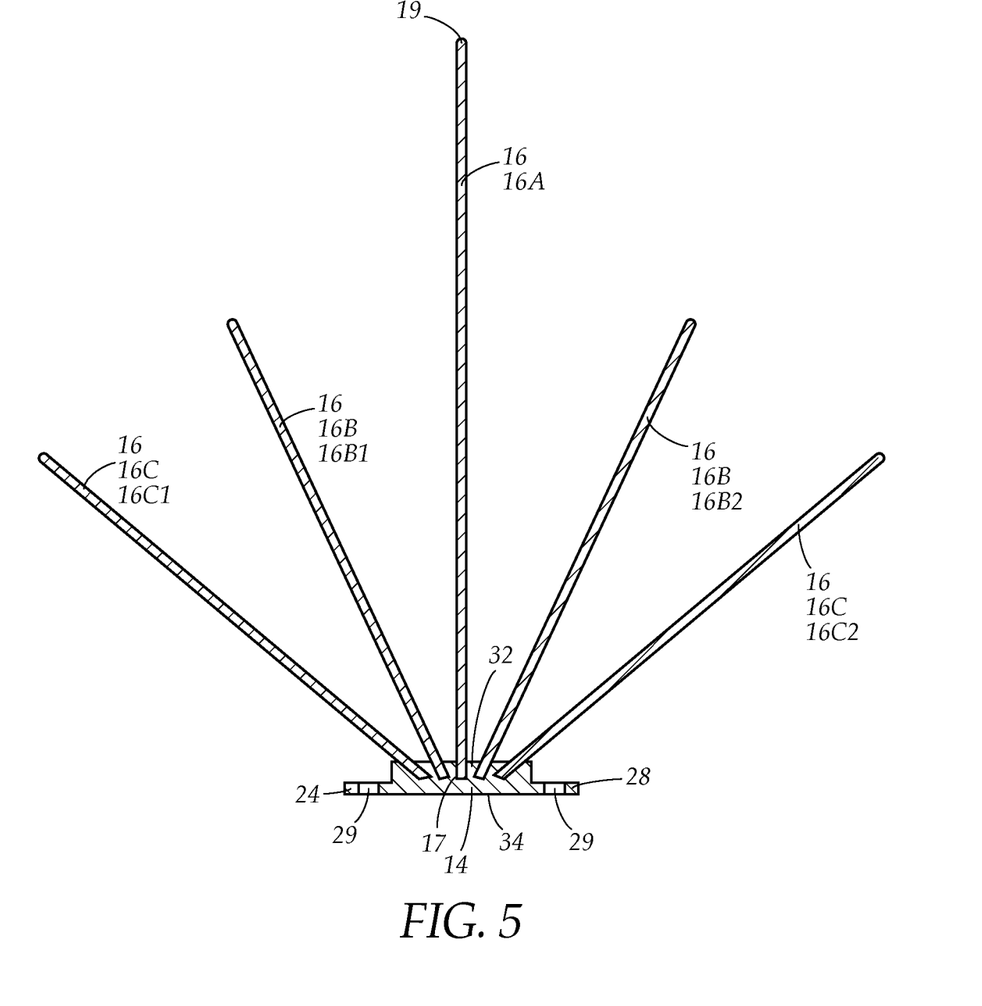
FIG. 5 is a cross-sectional view of the base member of the bird deterrent and repellant device, illustrating the spatial relationship of the spike members and the angles at which the spike members extend from the top surface of the base member according to one embodiment of the present disclosure.

Referring now to FIGS. 4 and 5, in conjunction with FIG. 2, the base members 14 include a top surface 32 and a bottom surface 34. The first end 24 and the second end 28 of each of the base members 14 each include a channel 29 for pivotably connecting to a base member holding element 36 disposed at the first pivot point 26 and the second pivot point 30. The plurality of spike members 16 protrude upwardly and laterally outwardly from the top surface 32 of each of the base members 14. Each of the spike members 16 include a fixed end 17 attached to the top surface 32, a free pointed end 19 for deterring and repelling birds and other pests, and a longitudinal length extending between the fixed end 17 and the free pointed end 19. The spike members 16 are aligned across the top surface 32 such that the spike members 16 are coplanar with respect to one another. In embodiments, the spike members 16 include at least three spike members comprising an inner spike member 16A and a first pair of outer spike members 16B including a first outer spike 16B1 member and a second outer spike member 16B2. The inner spike member 16A includes a longitudinal length that is greater than the longitudinal length of the first pair of outer spike members 16B. The inner spike member 16A protrudes perpendicularly with respect to the top surface 32. The first outer spike 16B1 member and the second outer spike member 16B2 protrude not perpendicularly with respect to the top surface 32 such that they extend at an acute angle with respect to a surface upon which the bird deterrent and repellant device is mounted. The first outer spike member 16B1 and the second outer spike member 16B2 extend from the top surface 32 of each of the base members 14 between the first pivot point 26 and the second pivot point 30. The first outer spike member 16B1 is positioned between the inner spike member 16A and the first pivot point 26 and overhangs beyond the first pivot point 26. The second outer spike member 16B2 is positioned between the inner spike member 16A and the second pivot point 30 and overhangs beyond the second pivot point 30.

In other embodiments, the spike members 16 include at least five spike members comprising a second pair of outer spike members 16C including a third outer spike member 16C1 and a fourth outer spike member 16C2. The third outer spike member 16C1 and the fourth outer spike member 16C2 extend from the top surface 32 of each of the base members 14 between the first pivot point 26 and the second pivot point 30. The third outer spike member 16C1 is positioned between the first outer spike member 16B1 and the first pivot point 26 and overhangs beyond the first pivot point 26. The fourth outer spike member 16C2 is positioned between the second outer spike member 16B2 and the second pivot point 30 and overhangs beyond the second pivot point 30. The third outer spike member 16C1 and the fourth outer spike member 16C2 protrude not perpendicularly with respect to the top surface 32 of the base members 14 such that they extend at an acute angle with respect to the surface upon which the bird deterrent and repellant device 10 is mounted. The acute angle at which the first pair of outer spike members 16B extend is greater than the acute angle at which the second pair of outer spike members extend 16C. The first pair of outer spike members 16B and the second pair of outer spike members 16C include the same longitudinal length. The second pair of outer spike members 16C include a larger overhang, or extend further laterally outwardly, than the first pair of outer spike members 16B.

Figure 3A:
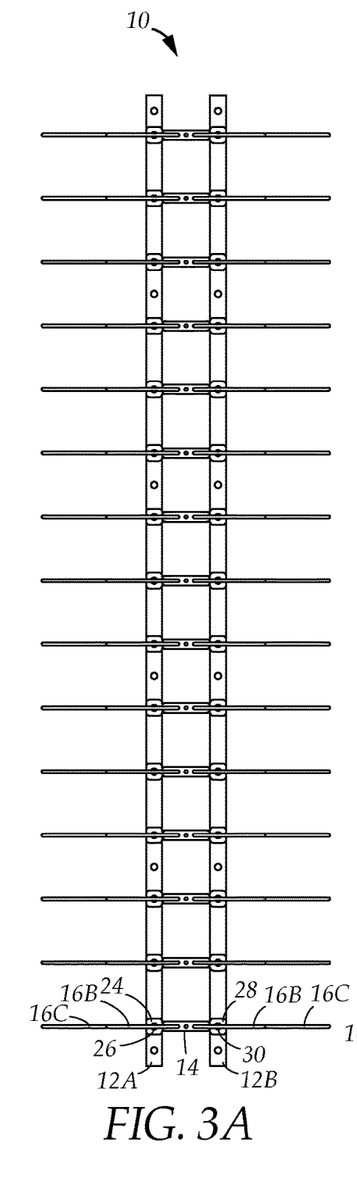
FIG. 3A is a top plan view of the bird deterrent and repellant device, illustrating the device in its wide configuration according to one embodiment of the present disclosure.
Figures 3B, 3C:
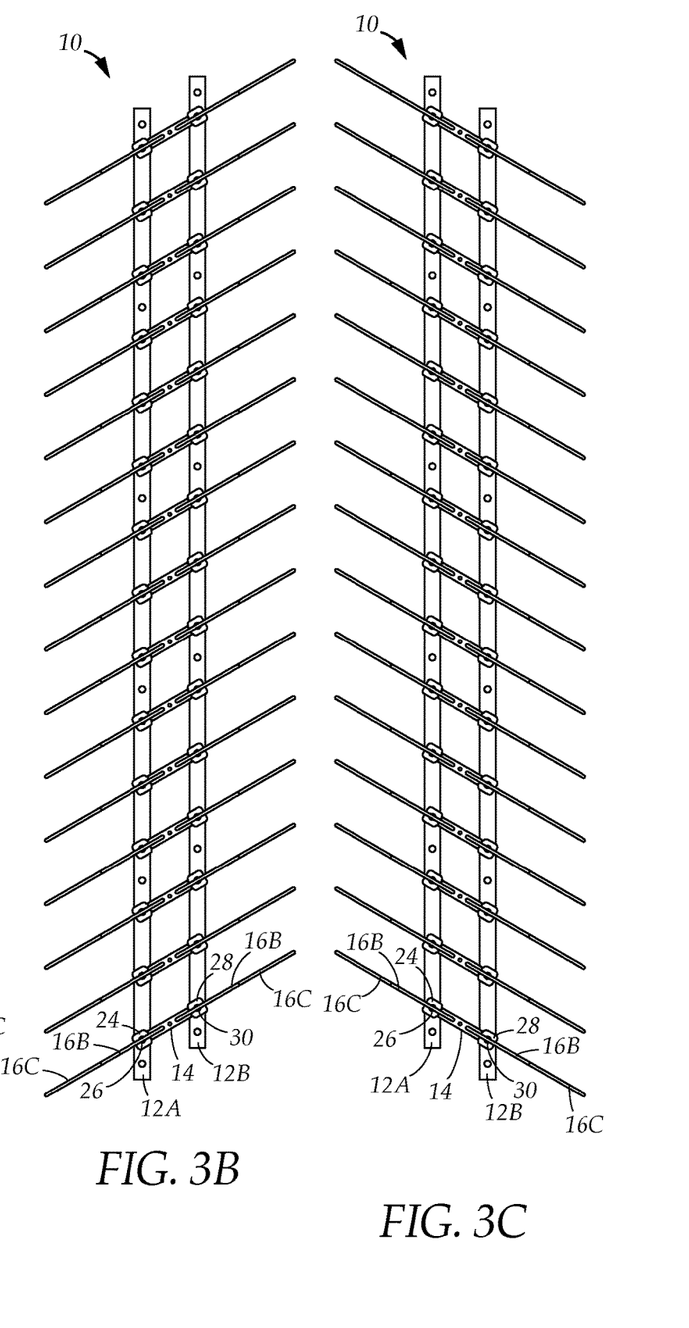
FIG. 3B is a top plan view of the bird deterrent and repellant device, illustrating the base members rotated counterclockwise to transition the device to its narrow configuration according to one embodiment of the present disclosure.
FIG. 3C is a top plan view of the bird deterrent and repellant device, illustrating the base members rotated clockwise to transition the device to its narrow configuration according to one embodiment of the present disclosure.

Referring now to FIG. 3A-3C, the first end 24 and the second end 28 of the base members 14 are configured to rotate clockwise or counterclockwise about the first pivot point 26 and the second pivot point 30, respectively, relative to the first and second elongated main holding members 12A, 12B to selectively transition the bird deterrent and repellant device 10 between a wide configuration and a narrow configuration. In the wide configuration, the base members 14 are substantially perpendicular to the first and second elongated main holding members 12A, 12B, as shown in FIG. 3A. In this way, rotation of the base members 14 to be perpendicular with respect to the first and second elongated main holding members 12A, 12B maximizes the distance between the first and second elongated main holding members 12A, 12B, which in turn maximizes the extent at which the first pair of outer spike members 16B and the second pair of outer spike members 16C extend laterally outwardly with respect to the first and second elongated main holding members 12A.

In the narrow configuration, the base members 14 are not perpendicular with respect to the first and second elongated main holding members 12A, 12B, and are rather sloping or slanted with respect to the first and second pivot points, respectively, as shown in FIGS. 3B and 3C. In this way, rotation of the base members 14 to slant or not be perpendicular with respect to the first and second elongated main holding members 12A, 12B decreases the distance between the first and second elongated main holding members 12A, 12B to a distance smaller than the distance between the first and second elongated main holding members 12A, 12B in the wide configuration. This in turn decreases the extent at which the first pair of outer spike members 16B and the second pair of outer spike members 16C extend laterally outwardly with respect to the first and second elongated main holding members 12A, 12B such that the extent at which the first pair of outer spike members 16B and second pair of outer spike members 16C extend laterally outwardly with respect to the first and second elongated main holding members 12A, 12B in the narrow configuration is less than the extent at which the first pair of outer spike members 16B and the second pair of outer spike members 16C extend laterally outwardly with respect to the first and second elongated main holding members 12A, 12B in the wide configuration. Transitioning the bird deterrent and repellant device 10 to the narrow configuration decreases the overall width of the device which allows it to be more compact for storing and transportation purposes.

Figure 6:
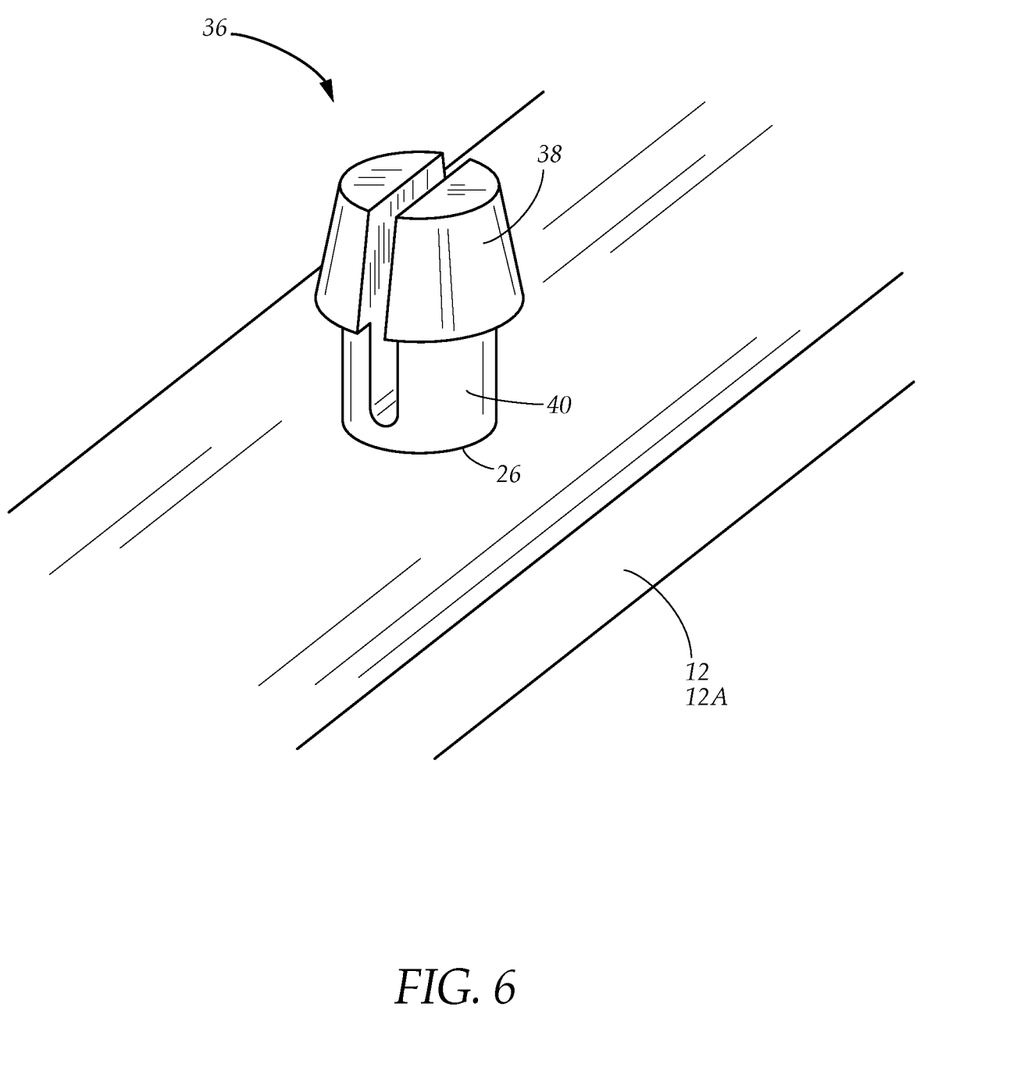
FIG. 6 is a perspective view of the base member holding element of the bird deterrent and repellant device, illustrating the conical and cylindrical portions of the base member holding element which enable reception and rotation of the base members thereabout according to one embodiment of the present disclosure.

Referring now to FIG. 6, in conjunction with FIG. 2, the base member holding element 36 pivotally connects the base members 14 to the first and second elongated main holding members 12A, 12B. The base member holding element 36 includes a free upper split conical portion 38, a lower split cylindrical portion 40 fixed to the first and second elongated main holding members 12A, 12B at the pivot points 26, 30, and an axis upon which each respective base member 14 pivots. The channels 29 (see FIGS. 4 and 5) of each of the base members 14 are configured to slidably engage, or snap, onto the base member holding elements 36 by sliding over the upper split conical portion 38 to the lower split cylindrical portion 40. Once positioned over the lower split cylindrical portion 40, the base members 14 may rotate clockwise and counterclockwise about the axis of the base member holding element 36 with respect to the first and second elongated main holding members 12A, 12B. The base member holding elements 36 form the vertices of the quadrilateral formed by adjacent base members 14.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly. The term "substantially" is defined as at least 95% of the term being described and/or within a tolerance level known in the art and/or within 5% thereof.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a bird deterrent and repellant device. The disclosure is illustrated by example in the drawing figures, and throughout the written description. It should be understood that numerous variations are possible, while adhering to the inventive concept. Such variations are contemplated as being a part of the present disclosure.

What is claimed is:

1. A bird deterrent and repellant device for attachment to a surface, comprising:
   a pair of elongated main holding members including a first elongated main holding member and a second elongated main holding member, each of the first and the second elongated main holding members including a first end, a second end, the first end opposite the second end, a longitudinal length extending between the first end and the second end, each of the pair of elongated holding members adapted to attach to the surface;
   a plurality of base members connecting the first elongated main holding member and the second elongated main holding member, each of the base members parallel with respect to one another and including a first end pivotally connected to the first elongated main holding member at a first pivot point, a second end pivotally connected to the second elongated main holding member at a second pivot point, the first ends of the base members opposite the second ends of the base members, the base members further having a top surface and a plurality of spike members protruding upwardly from the top surface, each of the spike members including a fixed end attached to the top surface of the base member, a free pointed end, and a longitudinal length extending between the fixed end and the free pointed end, the spike members further including at least three spike members comprising an inner spike member and a first pair of outer spike members, the outer spike members extending from the top surface between the first and the second pivot points, the first pair of outer spike members overhanging beyond the first pivot point and the second pivot point, the longitudinal length of the inner spike member includes a longitudinal length that is greater than the longitudinal length of the first pair of outer spike members.

2. The bird deterrent and repellant device of claim 1, wherein the first end and the second end of the base members rotate clockwise or counterclockwise about the first pivot point and the second pivot point, respectively, relative to the first and second elongated main holding members to selectively transition the device between a wide configuration and a narrow configuration.

3. The bird deterrent and repellant device of claim 2, wherein in the wide configuration, the base members are substantially perpendicular to the first and second elongated main holding members, thereby maximizing a distance between the first and second elongated main holding members and maximizing the extent at which the first pair of outer spike members extend laterally outwardly with respect to the first and second elongated main holding members.

4. The bird deterrent and repellant device of claim 3, wherein in the narrow configuration, the base members are not perpendicular with respect to the first and second elongated main holding members, thereby decreasing the distance between the first and second elongated main holding members to a distance smaller than the distance between the first and second elongated main holding members in the wide configuration and further decreasing the extent at which the first pair of outer spike members extend laterally outwardly with respect to the first and second elongated main holding members such that the extent at which the first pair of outer spike members extend laterally outwardly with respect to the first and second elongated main holding members in the narrow configuration is smaller than the extent at which the first pair of outer spike members extend laterally outwardly with respect to the first and second elongated main holding members in the wide configuration.

5. The bird deterrent and repellant device of claim 4, further comprising a base member holding element disposed at each of the first and second pivot points, the base member holding element including an axis and enabling the clockwise and counterclockwise rotation of the first and second ends of the base members with respect to the first and second elongated main holding members about the axis.

6. The bird deterrent and repellant device of claim 5, wherein:
   each of the base members forms a quadrilateral with an adjacent base member; and
   the base member holding elements disposed at each of the first and second ends of the adjacent base members form the vertices of the quadrilateral.

7. The bird deterrent and repellant device of claim 6, further comprising one or more mounting holes disposed along the longitudinal length of each of the pair of elongated main holding members for receiving a fastener therethrough to attach each of the elongated main holding members to the surface.

8. The bird deterrent and repellant device of claim 7, wherein the at least three spike members are aligned across the top surface of the base members such that the spike members are coplanar with respect to one another.

9. The bird deterrent and repellant device of claim 8, wherein:
   the inner spike member protrudes perpendicularly with respect to the top surface of the base members and the first pair of outer spike members protrude not perpendicularly with respect to the top surface of the base members such that they extend at an acute angle with respect to the surface; and the first pair of outer spike members include a first outer spike member and a second outer spike member, the first outer spike member positioned between the inner spike member and the first pivot point, the second outer spike member positioned between the inner spike member and the second pivot point.

10. The bird deterrent and repellant device of claim 9, wherein the first outer spike member extends beyond the first pivot point and the second outer spike member extends beyond the second pivot point.

11. The bird deterrent and repellant device of claim 10, wherein the spike members include at least five spike members including a second pair of outer spike members extending from the top surface of the base members, the second pair of outer spike members including a third outer spike member and a fourth outer spike member, the third outer spike member positioned between the first outer spike member and the first pivot point and the fourth outer spike member positioned between the second outer spike member and the second pivot point.

12. The bird deterrent and repellant device of claim 11, wherein:
the at least five spike members are aligned across the top surface of the base members such that the spike members are coplanar with respect to one another; and
the second pair of outer spike members protrude not perpendicularly with respect to the top surface of the base members such that they extend at an acute angle with respect to the surface.

13. The bird deterrent and repellant device of claim 12, wherein the acute angle at which the first pair of outer spike members extend is greater than the acute angle at which the second pair of outer spike members extend.

14. The bird deterrent and repellant device of claim 13, wherein the first pair of outer spike members and the second pair of outer spike members include the same longitudinal length.

15. The bird deterrent and repellant device of claim 14, wherein the third outer spike members overhang beyond the first pivot point and the fourth spike member overhangs beyond the second pivot point, the second pair of outer spike members including a larger overhang than the first pair of outer spike members.

16. The bird deterrent and repellant device of claim 15, wherein in the wide configuration, the extent at which the second pair of outer spike members extends laterally outwardly with respect to the first and second elongated main holding members is maximized.

17. The bird deterrent and repellant device of claim 16, in the narrow configuration, the extent at which the second pair of outer spike members extend laterally outwardly with respect to the first and second elongated main holding members is decreased such that the extent at which the second pair of outer spike members extend laterally outwardly with respect to the first and second elongated main holding members in the narrow configuration is smaller than the extent at which the second pair of outer spike members extend laterally outwardly with respect to the first and second elongated main holding members in the wide configuration.

18. The bird deterrent and repellant device of claim 17, wherein each of the first end and the second end of each of the base members include a channel for pivotably connecting to the base member holding element.

19. The bird deterrent and repellant device of claim 18, wherein:
the base member holding element further comprises a free upper split conical portion and a lower split cylindrical portion fixed to the first and second elongated main holding members; and
the channels of each of the base members are configured to snap onto the base member holding element by sliding over the upper split conical portion to the lower split cylindrical portion.

* * * * *